March 7, 1939. H. B. CLEVELAND 2,149,252
PROCESS AND APPARATUS FOR DEWATERING MATERIALS
Filed April 22, 1933 2 Sheets-Sheet 1
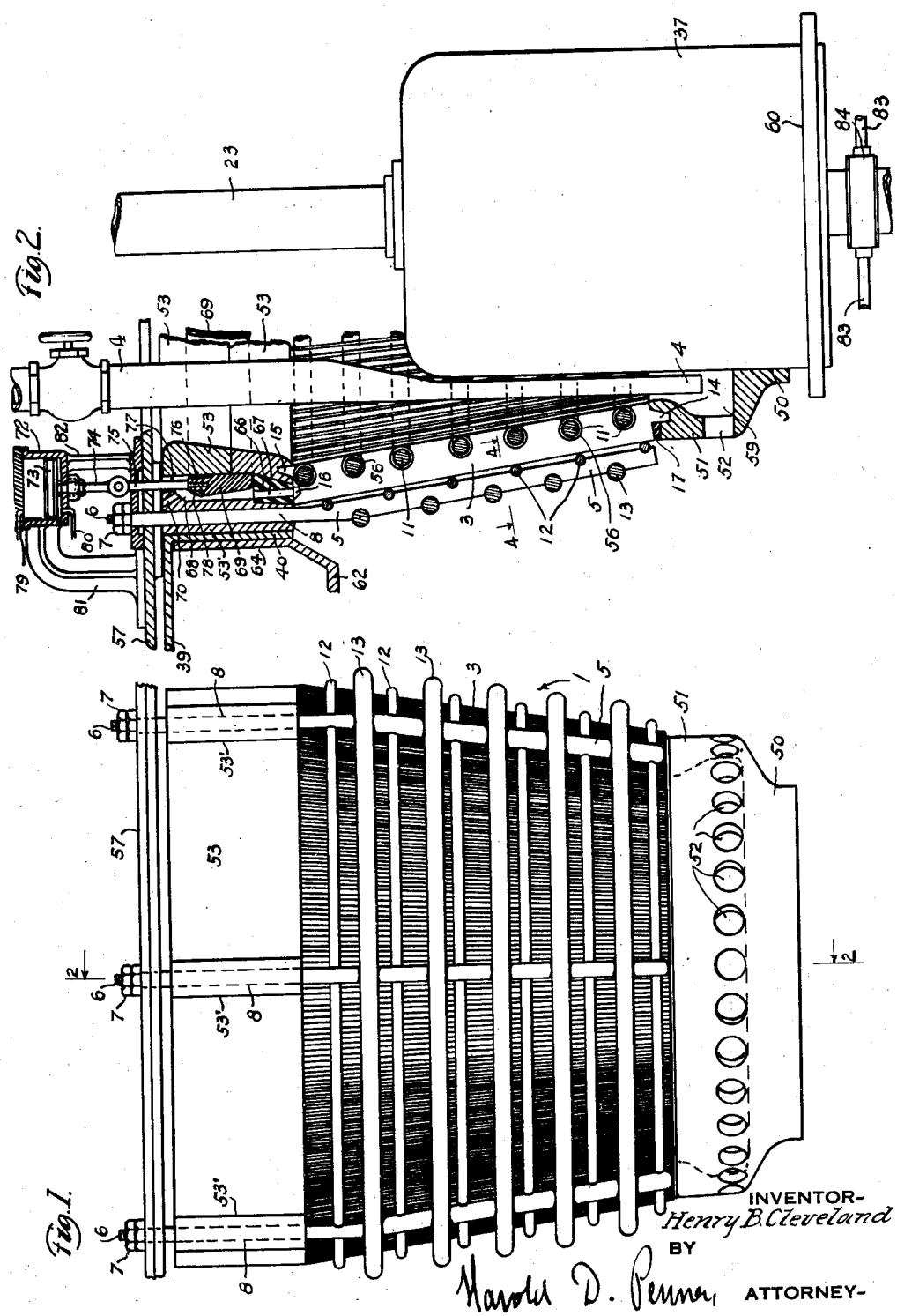
INVENTOR-
Henry B. Cleveland
BY
Harold D. Penner, ATTORNEY-

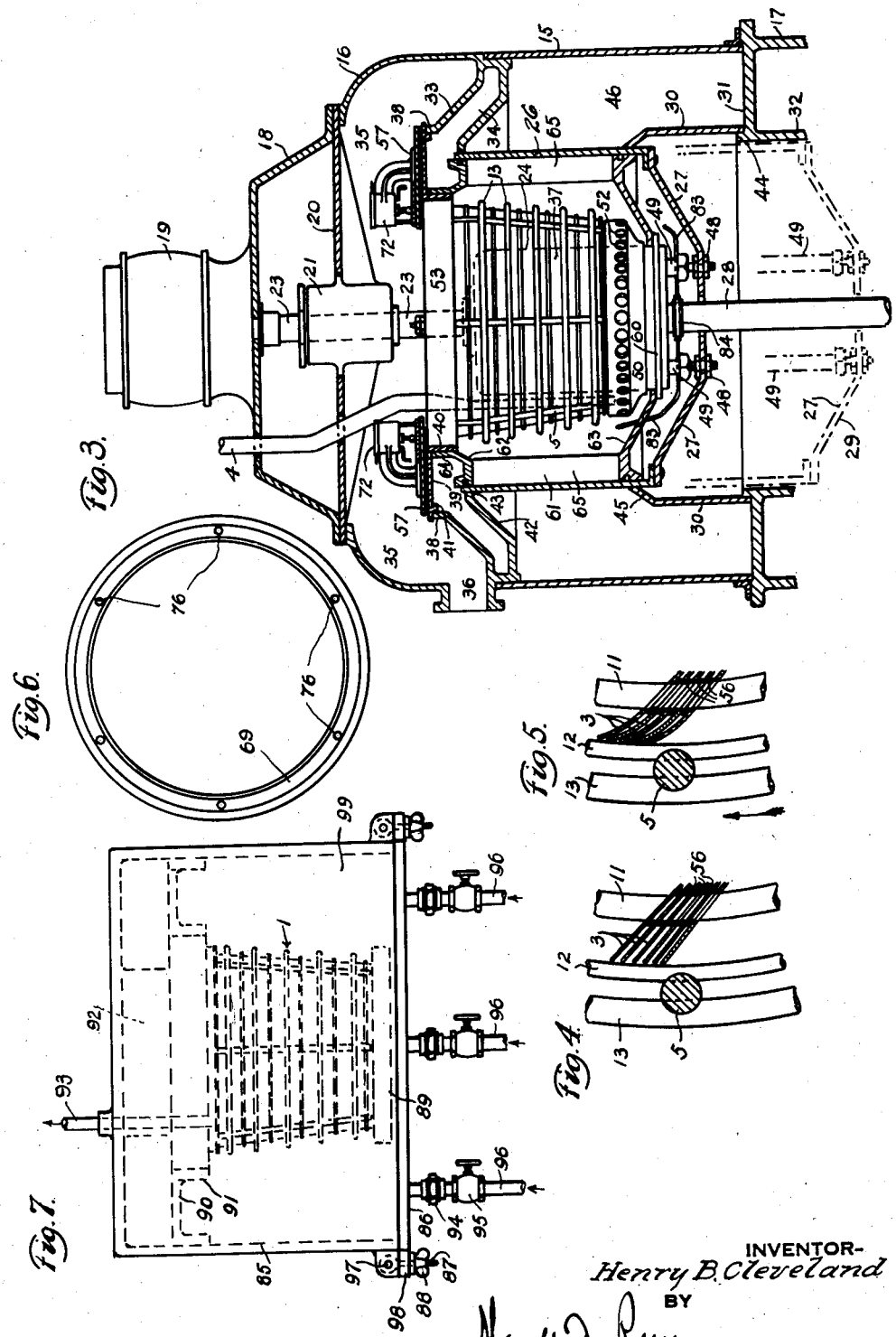

Patented Mar. 7, 1939

2,149,252

UNITED STATES PATENT OFFICE 2,149,252

PROCESS AND APPARATUS FOR DEWATERING MATERIALS

Henry B. Cleveland, New York, N. Y.

Application April 22, 1933, Serial No. 667,347

17 Claims. (Cl. 210—64)

The present invention relates to a process and a centrifugal apparatus for dewatering material, and can be appropriately used in many different lines of endeavor, where the use of such a machine is indicated. In the present instance this machine is well adapted for dewatering activated or other sewage sludge, thereby to separate and cake the solids from the water, and automatically to discharge both. The water is constantly filtered and discharged during operation and the cake is intermittently discharged, as required, at the end of a run.

In many respects the present device operates in the same manner and upon similar operative principles as that disclosed in my United States Patent #1,588,526, issued on June 15, 1926, in which patent there is disclosed a material dewatering device in which the separation of the sewage solids is effected by centrifugal action with a renewable filter material or with a filter compressed to a filtering condition by centrifugal force.

One of the important features of the present improvement lies in the improved type of filter, which rotates, and which, by edge impaction, in part, on the water, causes the water to be forced, contracentrifugally, towards the axis of the centrifuge, through the filter and thence to discharge.

By the present filter arrangement, an active permanent and cleanable filter surface, of large area is presented to the activated or other sewage sludge, to be unwatered, with a consequent high capacity of operation, thereby, permitting the use of a smaller apparatus, in some instances, with consequent economy of operation.

These and other capabilities, will be apprehended as the herein description proceeds, and it is obvious that modifications may be made in the structure herein disclosed, without departing from the spirit hereof, or the scope of the appended claims.

The invention accordingly comprises the several steps and the relation and order of one or more of such steps with respect to each of the others, and the apparatus embodying features of construction, combinations of elements and arrangements of parts which are adapted to effect such steps, all as exemplified in the following detailed disclosure, and the scope of the application of which will be indicated in the claims.

For a fuller understanding of the nature and objects of the invention reference should be had to the following detailed description taken in connection with the accompanying drawings, in which:

Fig. 1 is an elevational view of the rotary filter body, removed from the apparatus;

Fig. 2 is a sectional, fragmentary view, enlarged, but on the same scale as Fig. 1, taken on the line 2—2 Fig. 1, looking in the direction of the arrows, with some appurtenant parts of the coacting parts added, in axial section;

Fig. 3 is a reduced scale view, showing partial axial section of some parts of the apparatus;

Fig. 4 is an enlarged sectional, fragmentary view taken on the line 4—4 Fig. 2, looking in the direction of the arrows showing the filter blades open, for cleansing;

Fig. 5 is a view, similar to Fig. 4, showing the filter blades closed for filtering action;

Fig. 6 is a plan view of a blade drainage ring valve; and

Fig. 7 is an elevational view of a modified form of construction.

In the construction of this apparatus the general features are the same and function the same as in the above noted patent. To this end, there is an outer main cylindrical casing 15, Fig. 3, which in turn supports an upper domed cap 16, upon which, in turn is mounted a covering top cap plate 18. Upon the top of this latter top cap is vertically mounted an electric motor 19. The motor is affixed to and drives a vertical shaft 23, which is, in turn supported in a vertical bearing 21 which bearing is an integral part of the horizontal bearing web 20, which is held at its outer circumferential edge between the flanges of dome 16 and top cap 18.

The shaft 23 extends down to and is connected to a hydraulic mechanism 37, and which mechanism is rotated by the electric motor 19. This mechanism is the usual type of device used to regulate several successive operations at predetermined times. It controls the lowering of the cylinder 26 and the action of the pistons 73, in their proper sequence, the function of which elements will be described below. The mechanism 37 may, for example, be that known as the Ter Meer device.

Interiorly of the casing there are a number of partitions as follows; from the lower part of the dome 16 is an upwardly inclined wall 33 which has a vertical flange 38, upon which rests a movable closure plate 39 this in turn having downwardly disposed annular flanges 40 and 41. Below the inclined wall 33 and also integral with the dome 16 is a second inclined partition 42, this in turn having an inner short horizontal flange 43.

Below, as in Fig. 3, there is a base portion 17, having an inner horizontal flange 31, and merging with the flange 31 is a second, inner wall 32, which has a short vertical nesting flange 44 thereon. Nested over the flange 44 and resting upon the partition 31, is a cylindrical inner shell 30, the upper inner end of which is inclined, as at 45, and rests in non-rotary contact with a reciprocable, rotatable outer cake holding cylinder 26 of the centrifuge.

The upper end of the cylinder 26 is in rotary contact with the horizontal flange 43 of partition 42. As thus described, the walls 15—26 and the partitions 42—31 encompass a cake receiving chamber 46, into which is received the caked sludge at the end of each dewatering run, as will be later described.

At the bottom of the cylinder 26, is affixed a slightly coned bottom plate 27, the flat portion of which is bored to permit the passage of a shaft 28 downwardly therethrough. The bottom plate 27 is connected by suitable connections 48—48 to two, spaced, hydraulically actuated plungers, 49—49, which are reciprocally mounted in the hydraulic mechanism 27. These plungers when operated, cause the cylinder 26 and its appurtenant bottom 27 to be moved downwardly to its lowermost position as indicated by the dotted lines 29, Fig. 3. This action is the same as described in the foregoing noted patent, with the same function.

The shaft 28 is hollow and is suitably supported in a lower bearing not shown, but understood, to permit both rotation of said shaft, and to permit of the sliding action thereon of said cylinder 26, when the hydraulic means described causes the cylinder 26 to descend or ascend upon said shaft.

The hydraulic cylinder 37 has, near its bottom end, Figs. 2 and 3, an integral flange 60. This flange operatively supports a webbed sludge centrifuge, generally denoted by 61, this comprising an upper flanged ring portion 62, Fig. 3, the upper flange 64 of which nests with and is supported by flange ring 40, and the lower bottom head 63 the inner flanged periphery of which is fixedly supported on the top face of flange 60 of the hydraulic mechanism casing 37, as previously noted.

The outer circumferential edges of the upper flanged ring portion 62 and the lower bottom head 63 may be provided with piston ring fittings as indicated in Fig. 3, to permit a liquid tight sliding fit between said circumferential edges and the inner face of slidable cylinder 26.

The upper ring 62 and the lower head 63 are integrally joined by a plurality of vertically standing webs 65, these being spaced apart and acting as means to impart rotary action to the incoming activated sludge, to receive the sludge as a cake as it builds up during operation, and to hold said cake in a releasable manner to discharge the same, at desired intervals. To this extent the sludge centrifuge is identical in function to that shown in my above noted patent.

In the interior of the cylinder 26, and also the interior of the sludge centrifuge is located a filter basket generally denoted by 1, Fig. 1, and this will now be described. Near the bottom of the hydraulic mechanism, Fig. 2, is fixedly located a sludge centrifuge ring, consisting of a base portion 50 which is affixed to the cylindrical wall of the hydraulic mechanism 37. The base 50 has an upstanding, spaced flange 51, which has a series of apertures 52 therethrough, around its circumference. This may be termed a feeding ring. The upper edge of the flange 51 is provided with an annular slotted face, into the slot of which is seated the tongues 14 of a series of filter blades 3, Fig. 2. On the upper outer ledge of the blades 3, Fig. 2 is placed a soft rubber gasket 17, which flange 51 is placed a soft rubber gasket 17, which acts as a sealing seat for the lower, non-tongued edges of the filter blades.

The filter blades 3, as will be noted in Figs. 1 and 2 are annularly located and are plural in number, and are vertically mounted at a slight angle, their lower ends resting on the gasketed flange face of sludge ring 50, and their upper tongued ends 15, being received in an annular groove in the bottom edge of composite top ring 53.

The filter blades 3, further are provided with a plurality of holes along their operative length, thereby to permit them to be loosely strung on a series of endless rings 11, which are round in cross section, as in Fig. 2.

The filter blades 3 are of spring metal and are extremely thin and flexible, being only a few thousandths of an inch in thickness. They are provided, along one face thereof as in Figs. 4 and 5, with a series of thin, blade separating washers 56, which are also strung upon the endless circular rods 11, and these washers, being about the same or lesser thickness than the filter blades, keep said blades separated when in their open non-filtering and filtering positions, as in Fig. 4, where the blades are shown in non-filtering position, and in Fig. 5 where the blades are sprung into filtering position.

As the filter blades must be controlled so that they may assume the open, cleansing position or the closed filtering position, means are provided to cause the actuation of the opening or closing of said blades. By referring to Figs. 1, 2 and 3, it will be noted that the filter basket structure, which merely rotates, is surmounted by a top flange generally denoted by 57, this flange being annular in form and is rotatably supported upon closure plate 39.

A filter basket support ring 53 has a plurality of vertical, bored bosses 53' on its outer periphery, and these are equidistantly spaced, as in Fig. 1. Into each of the bosses 53', is mounted, for vertical adjustment, up and down, a straight cylindrical extension 8, of each of a set of pull bars, the lower ends 5 of which are inwardly inclined, as in Figs. 1 and 2.

The lower, inclined ends 5 have seats cut therein on their exterior faces and a plurality of endless hoops 13 are seated in said seats. These hoops may be welded in position.

The interior faces of the lower bars 15 have a plurality of similar seats cut therein and receive therein a plurality of endless hoops 12, which also may be welded in position. Thus the bars 8—5, and the hoops 12—13 are in the form of an integral pressure basket, and when in operative filter blade closing or opening position the outer edges of the filter blades 3, as in Figs. 1 and 2, are always in contact with the inner surfaces of the pressure hoops 12.

The filter blade basket is shown tapering inwardly from top to bottom, the pressure basket partakes the same degree of taper. As the filter basket has only one movement, i. e. a rotary movement, being fixedly held against vertical movement, conversely, the pressure basket has a relative up and down movement to the basket, with which it rotates. Therefore, at the end of a day's operation, or whenever it becomes necessary to clean the filter, the rotation of the centrifuge is stopped, and the pressure basket is lowered, by, for instance, unscrewing the nuts 7 from the threaded ends of rods 5, the pressure basket or cage is lowered away from the outer edges of the filter blades 3, and the blades left in loose open position, as in Fig. 4. In this position the blades may be cleansed of any clogging that may occur, as will be described later.

After the blades have been loosened and cleansed, they may be reclosed into filtering position by tightening the nuts 7 upon the threaded ends 6 of bars 5, and thus draw the pressure cage upwardly upon the edges of the flexible filter blade 3, and thus cause the blades to become curved, and to be sprung, as in Fig. 5, bringing the adjacent outer edges of the blades nearly in contact with the face of its adjacent blade. Obviously, as the blades are very thin, springlike and flexible, the pressure cage may be drawn up so tightly, as practically to make the filter basket liquid tight, or the adjustment may be made so so as to leave the blades in any intermediate position between the tight closed position of Fig. 5 and the full open position of Fig. 4, and thus the filter blades may be adjusted for any desired degree or range of filtering.

It will also be obvious, that while the pressure cage and filter basket are tapered to obtain the novel function of adjustment, as above described, that the blades 3 are normally straight, and when in open natural unconstrained position, as in Figs. 1 and 4, they present wider spaces of separation at their tops than at their bottoms.

Therefore when the pressure cage is moved upwardly on the filter blades, and in order to accommodate themselves to the pressure and filtering position, the said blades, as the upward pressure is applied, gradually assume, and finally retain a helical form, progressively greater from the bottom to the top of said blades, until the pressure cage is released after which the blades return to their normal straight, flat position.

The operation of the device is as follows, assuming that the parts of the centrifuge are set in the position of Fig. 3, activated sludge is admitted from an external source through a pipe 4, Figs. 2 and 3, and is discharged from its lower flattened open end 4, Fig. 2 into the sludge centrifuge ring chamber 59, Fig. 2.

The centrifuge is rotating at high speed. The parts driven by the motor 19 are as follows; the hydraulic mechanism or head 37 and its affixed centrifugal sludge ring; the filter blade basket and its affixed pressure cage; the webbed cake drum 61—62—63—64; the outer cylinder 26 and its bottom 20 and hollow shaft 28.

As the activated sludge is discharged into the sludge centrifuge ring it is given a rotary motion as it passes through the ports 52. During the interval, while the sludge is filling the centrifuge drum between the outer wall 26 and the outer surface of the filter blade basket, the centrifugal force to which the sludge has been subjected causes a separation of the solids in the sludge, which are thrown against the wall 26, from the water in the sludge, which is forced backward, through the inerstices or openings in the filter blade basket.

This process continues with the simultaneous separation of solids from the liquid sludge and the filtration of any fine matter which may be carried back by the water which is being forced against the filter blade basket until the cake forming against the wall 26 is built back to contact with the filter blade basket. During this process of forming the cake any fine particles in the effluent are held back in the drum by the filter blade basket while the clarified effluent passes through the filter blade basket and upward over the rounded inner top edge of the filter basket support ring 53, in a thin film, and then outward to the effluent channel.

When sufficient cake has been formed to fill the drum, the flow of the incoming sludge is cut off, rotation is continued, and all effluent in the filter blade basket, inside of the outer surface of this basket, is discharged upwardly through the ports 70, as will now be described.

The lower edge of the overflow rim 53 is open and has a seat therein and in which is inserted therein a soft rubber annulus 66, against the exposed lower face of which rests the upper edge-ends of the filter blades 3. The annulus 66, has a plurality of ducts therein, one of these, 67, being shown in Fig. 2. The filter blades are all provided with a notch 16 at their upper edge-ends, which acts to provide openings for water to pass through to ducts 67.

Composite overflow ring 53 has an annular chamber 68 therein, into which the ducts 67 lead. In the chamber 68 is located a blade drainage valve 69, in the form of a ring, this valve 69 being movable in said chamber 68. The upper end of the chamber is provided with an outwardly inclined series of centrifugal discharge ducts, one of which, 70, is shown in Fig. 2. This duct discharges fluid into the overflow space between flanges 39 and 57, and from thence into chamber 35, to discharge outlet 36.

After the sludge inlet valve has been closed which may be done by mechanism 37, the blade drainage valve, 69, is opened automatically by the same mechanism, with the drum in full rotation, by means of the piston cylinders 72, whose operation is described later.

Thus, with the valve ring 69, in the open position shown in Fig. 2, the effluent which has accumulated back of the blade filter basket and between the blades rises up between the blades 3, through notches 16, through ducts 67, past valve 69, up through centrifugal discharge ducts 70, and out to discharge port 36.

When the filter blade basket has thus been cleared of retained effluent, the hydraulic head 37, operates to cause plungers 49—49 to withdraw cylinder 26, downwardly to the dotted position shown in Fig. 3, and centrifugal action discharges the cake outwardly from between the drum webs 61—65, into the cake receiving chamber 46, from which the cake is thereafter removed in the usual manner.

The cylinder 26, is then returned to closed operative position, Fig. 3, valve 69 is moved to closed position, and another run to form another cake is commenced by opening a valve on the sludge inlet pipe 4, all of which is controlled by mechanism 37.

Whenever, in dewatering material which may tend to clog the filter blade basket openings, it is necessary to clean the filter blade basket, this operation is carried on as follows:

After the cake has been discharged, the cylinder 26, is returned to closed operative position, the rotation of the drum is stopped, and all the pressure basket adjustment means denoted by 7, Fig. 1, and shown as threaded nuts on threaded ends 6, on the ends of rods 8, are unscrewed, thus lowering the pressure basket a sufficient amount to permit the filter blades to become free and to assume an unconstrained open and floating position on their supporting hoops, 11. Then the centrifuge is rotated, and clean water is introduced into the cylinder 26, through the sludge inlet pipe 4. As the water gradually fills the centrifuge drum it finally reaches back and up to the bottom of the composite overflow ring or rim 53.

At this point valve 69 is opened by hand operation of a valve on the pressure line supplying the pressure head to the series of closed piston cylinders 72.

Thus, with the valve ring 69 in the open position shown in Fig. 2, with the filter blades released, as last described, the incoming clear water continues to rise past the blades 3 up through notches 16, through ducts 67, past valve 69, up through centrifugal discharge ducts 70, and out to discharge port 36.

This latter action clears the blades and edges thereof of any remaining clogging material, which is removed by the above noted last described operation.

After the blades are cleansed, the machine and inflow of clear water is stopped, the ring valve 69 is moved upwardly to close ducts 70, and to completely seal the upper end of chamber 68, and the pressure basket is again drawn up to close the filter blades, thus leaving the centrifuge in condition again to receive and treat activated sludge from pipe 4.

In order to operate ring valve 69 to open or close discharge ducts, 70, a hydraulic means is provided, consisting of a plurality, six, preferably, of equally spaced apart, double acting, hydraulically actuated ring valve lifting means.

To this end, there is fixedly mounted upon the upper rotary flange 57, Figs. 2 and 3, by their brackets 81—82, a series of closed piston cylinders 72, in the bores of which are reciprocally mounted pistons 73. A piston rod 74 having one end connected to the lower face of each of the pistons, and a connecting rod 75 is pivotally connected at one end to the exposed end of the piston rod, while the other end of said connecting rod is threadedly attached to the upper portion of the ring valve 69 by the threaded holes 76, said connecting rod passing through bores provided therefor through the top flanges 57—39 and bore 77 in composite rim 53. The top outer edge of ring valve 69 is provided with an annular seat, in which a soft rubber ring 78 is seated. This forms a soft valve seat for closing the blade drainage ducts 70, when the ring valve is moved upwardly.

To move the ring valve 69 up or down, the closed cylinder, at each of its opposite heads has a single pipe leading therefrom, a pipe 79 at the upper head, and a pipe 80, at the lower head, Fig. 2. These pipes are connected at their lower opposite ends 83 to a nipple ring 84, which is mounted upon lower, hollow shaft 28, and is in communication with the pressure within the hydraulic head 37. The pipes 79 and 80, are broken away for convenience, in Figs. 2 and 3, and are provided with customary hand valves, not shown, but understood, whereby the hydraulic pressure, on either side of the pistons 73, may be controlled.

When the machine is operated to dewater material in which the solids are in a fibrous, stringy form and thus tend to clog the blade filter basket, or in any case when it is desired periodically to clean the blades, the pressure cylinders 72, are disconnected from the pistons 75, the blade drainage valve 69, is secured in fixed, closed position, and the pressure cylinders 72, are moved outwardly on flange 57, to connect with pull bars 5 6. By this arangement the filter blades may be automatically released to open position for cleaning at the beginning of each run. With the device thus hooked up and after sludge has been admitted for a predetermined interval, the hydraulic mechanism shuts off the sludge, causes the pistons 73 to raise the outer basket to close the blades 3 tightly, lowers the cylinder 26, whereby the solids are expelled into chamber 46, raises cylinder 26, and causes pistons 73 to lower the outer basket to open the blades 3 wide open, whereupon the filtered fluid retained within the chamber formed by the closed blades is thrown back out against cylinder 26 and washes the blades. Mechanism 37 then adjusts the pressure basket by pistons 73 so that blades 3 are in filtering position, and opens the sludge valve to repeat the operation.

The novel form of filter basket herein described may also be used for filtering in a non-rotary type of filter, such as a pressure filter, and this modification is illustrated in Fig. 7, wherein there is shown a stationary tank 85, of any desired shape and capacity, having a closed top. The bottom plate 86 is removable, and is normally held in a leak proof manner to the tank bottom, to close the same by a plurality of swing bolts 87 which are pivotally attached at 97, to the tank.

The removable bottom 86 has a plurality of slotted ears 98 to receive the bolts 87, and wing nuts tighten the cover 86 in closed position.

In the interior of the tank is located a flanged web 90, the flange 91 of which supports a pressure basket and its appurtenant filter basket structure 1, which is exactly like that shown in Fig. 1, with the exception that the centrifugal sludge ring 50 is substituted by a completely enclosing bottom disc 89, which closes the filter basket against the flow of fluid. As thus mounted liquid can only pass through the filter blades 3, as the filter basket cuts off the filter basket chamber 99 from the upper discharge chamber 92.

The removable bottom 86, has a plurality of inlet pipes 96, open to chamber 99, and these are connected to hand valves 95, which in turn are connected to short nipples by pipe couplings 94. The use of the pipe couplings permits release of the inlet pipes 96, when the cover is to be removed.

The top of the tank is provided with a discharge pipe 93, which opens into the upper chamber 92.

In use, with the assembly as shown in Fig. 7, material to be dewatered is passed through the pipes 96, until the level reaches the filter blades. Depending on the size of the filtering interstices, the liquid may flow past the blades gradually building up a cake in chamber 99. Pressure may be put on the entering material to be dewatered, if desired. As the clear liquid passes the filter blades it gradually fills up the filter basket interior, until it fills chamber 92, and then is discharged through discharge pipe 93. When sufficient cake has been formed in chamber 99, the pipes 96 and bottom 89 are removed, the cake withdrawn, the filter cleaned, and the apparatus reassembled for a further run.

Since certain changes in carrying out the above process and in the constructions set forth, which embody the invention, may be made without departing from its scope, it is intended that all matter contained in the above description or shown in the accompanying drawings, shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having thus described my invention what I claim is:—

1. In a process of the character described, the steps comprising centrifugally separating solids from a mixture, discharging the liquid from which said solids have been separated contra-centrifugally through exits, cleaning said exits by passing material therethrough in a direction different from the direction of said discharging liquid, and periodically removing said separated solids in substantially dry form while maintaining said centrifugal action.

2. A centrifugal dewatering machine, comprising a casing having separate chambers therein, one to receive discharged liquid and the other to receive separated solids, a rotatable filter basket comprising a plurality of cylindrically arranged blades, a pressure basket surrounding said filter basket and flexing said blades, means for supplying material to be dewatered, means on said filter basket for giving centrifugal impetus to said supplied material, a movable cylinder to receive the separated solids, means for moving the cylinder to discharge said solids and means for rotating the said baskets.

3. In a device of the character described, in combination, means adapted for receiving discharged liquid, means adapted for receiving separated solid matter, filter means having a wall comprising blades, means adapted for rearranging said blades whereby the size of the interstices between said blades is changed, and means for so displacing at least a portion of said matter-receiving means as to permit the discharge of said solid matter from said device.

4. In a device of the character described, in combination, means adapted for receiving discharged liquid, means adapted for receiving separated solid matter, filter means having a wall comprising blades, means adapted for rearranging said blades whereby the size of the interstices between said blades is changed, and means for so moving at least a portion of said matter-receiving means as to permit the removal of said separated solid matter from said device.

5. A centrifugal dewatering machine, comprising a casing having separate chambers therein, one to receive discharged liquid and the other to receive separated solids, a rotatable filter basket having a cylindrical series of radially arranged flexible blades, a pressure basket surrounding said filter basket and flexing said blades into filtering contact, means for supplying material to be dewatered, means for giving centrifugal impetus to said supplied material, a movable cylinder to receive the separated solids, means for withdrawing the cylinder to discharge said solid and means for rotating the said baskets.

6. A centrifugal dewatering machine, comprising a casing having separate chambers therein, one to receive discharged liquid and the other to receive separated solids, a rotatable filter basket having a cylindrical series of radially arranged blades, a movable basket surrounding said cylindrical formation to flex and unflex the blades thereof, means for supplying material to be dewatered, means for giving centrifugal impetus to said supplied material, to separate the solids thereof, a movable cylinder to receive the separated solids, means for moving the cylinder to discharge said solids radially outward and means for rotating the said basket to discharge the liquid radially inward.

7. A centrifuge, comprising a casing having separate chambers therein, one to receive discharged liquid and the other to receive separated solids, a rotatable filter basket having a cylindrical series of radially arranged blades, a movable basket surrounding said basket to flex and unflex the blades thereof, means for supplying material to be dewatered, means for giving centrifugal impetus to said material to separate the solids therefrom, means adapted for discharging the material remaining after said solids have been separated therefrom, said discharge being toward points nearer the axis of rotation than said separated solids, a movable cylinder to receive the separated solids, means for moving the cylinder to discharge said solids radially outward, and means for rotating the said baskets and the said cylinder.

8. A centrifuge, comprising a casing having separate chambers therein, one to receive discharged liquid and the other to receive separated solids, a rotatable filter basket having a cylindrical series of radially arranged blades, a movable basket surrounding said filter basket to flex and unflex the blades thereof, means for supplying material to be dewatered, means for giving centrifugal impetus to said material to separate the solids therefrom, and comprising a rotatable feeding ring which is adapted to impart to said material a rotation, means adapted for discharging the material remaining after said solids have been separated therefrom, said discharge being toward points nearer the axis of rotation than said separated solids, a movable cylinder to receive the separated solids, means for moving the cylinder to discharge said solids radially outward, and means for rotating the said baskets and said cylinder.

9. A filter for dewatering machines, comprising a plurality of thin flexible blades arranged in a filtering formation, means for supporting said blades in normally loose formation when in non-filtering position and means for adjustably flexing and closing said blades to decrease the interstices therebetween, to form a filter.

10. In a centrifuge, the combination comprising a plurality of blades arranged to form a substantially cylindrical filter, said plurality of blades being rotatable as a unit, means adapted for adjustably rearranging the position of said blades whereby the interstices between said blades are varied and means to rotate said blades about the longitudinal axis of said cylindrical filter.

11. In a device of the character described, the combination comprising means adapted for centrifugally separating solids from a mixture containing fluid material, means adapted for filtering the fluid from which said solids have been separated, means adapted for washing said filtering means while said separated solids are still in said device, and means for permitting removal of said washing fluid from said device without displacement of or alteration of the consistency of said separated solids.

12. In a device of the character described, the combination comprising means adapted for centrifugally separating solids from a mixture containing fluid material, means adapted for filtering the fluid from which said solids have been separated, and means adapted for removing the unfiltered fluid and positioned between said separated solids and said filtering means.

13. In a device of the character described, the combination comprising means adapted for centrifugally separating solids from a mixture containing fluid material, means adapted for filtering the fluid from which said solids have been separated, means adapted for shutting off the supply of said mixture, and means adapted for passing a portion of said filtered fluid back through said filtering means and away from said separated solids, whereby said filtering means are washed.

14. A filter for centrifugal dewatering machines, comprising a plurality of thin flexible blades loosely arranged in a cylindrical formation, means for supporting said blades in normally loose formation when in non-filtering position and adjustment means for variably flexing and closing said blades to decrease the interstices therebetween to form a circular filter.

15. A filter for dewatering machines, comprising a plurality of thin flexible blades arranged side by side in a filtering formation, means for supporting said blades in normally loose formation when in non-filtering position and adjustable means for flexing and closing the edges of said blades to decrease the interstices therebetween, to form a filter.

16. A filter for dewatering machines, comprising a plurality of thin flexible blades loosely arranged side by side and in a filtering formation, means for supporting said blades in the filtering formation with their edges forming the interior and exterior side walls of the filter, means for flexing the blades on their edges forming the exterior of the filter, thereby to cause the filter blades to flex to decrease or increase the filtering interstices therebetween.

17. A filter for dewatering machines, comprising a plurality of thin flexible filter blades loosely arranged side by side in a cylindrical formation, means for holding said blades in the cylindrical formation with their edges forming the interior and exterior side walls of the cylinder, means for flexing the blades on their edges forming the exterior of the cylinder, thereby to cause the filter blades to flex to decrease or increase the filtering interstices therebetween.

HENRY B. CLEVELAND.